United States Patent [19]
Ohi

[11] Patent Number: 5,162,709
[45] Date of Patent: Nov. 10, 1992

[54] APPARATUS FOR CONTROLLING BLOWER MOTOR OF AUTOMOBILE AIR-CONDITIONER

[75] Inventor: Shinichi Ohi, Konan, Japan

[73] Assignee: Diesel Kiki Co., Ltd., Tokyo, Japan

[21] Appl. No.: 513,811

[22] Filed: Apr. 25, 1990

[30] Foreign Application Priority Data

| Apr. 25, 1989 | [JP] | Japan | 1-105545 |
| May 17, 1989 | [JP] | Japan | 1-123689 |
| Jun. 8, 1989 | [JP] | Japan | 1-67063 |

[51] Int. Cl.$^5$ ............................................. H02P 5/00
[52] U.S. Cl. .................................... 318/254; 318/811; 388/904
[58] Field of Search ............... 318/254, 254 A, 138, 318/137, 439, 449, 801, 811, 800, 799, 696, 444, 443, 802, 803, 807, 810, 126, 128, 129, 66; 310/51; 98/8, 10, 94.1, 2.01, 22, 2.11, 2, 2.19, DIG. 10; 388/804, 805, 811, 904

[56] References Cited

U.S. PATENT DOCUMENTS

| 4,212,056 | 7/1980 | Kitamura et al. | 318/801 X |
| 4,310,791 | 1/1982 | Akamatsu | 318/800 |
| 4,312,518 | 3/1982 | Akamatsu | 318/696 |
| 4,588,934 | 5/1986 | Suzuki et al. | 318/444 |
| 4,651,068 | 3/1987 | Meshkat-Razavi | 318/254 |
| 4,670,696 | 6/1987 | Byrne et al. | 318/138 X |
| 4,926,104 | 5/1990 | King et al. | 318/799 X |

Primary Examiner—A. Jonathan Wysocki
Attorney, Agent, or Firm—Wenderoth, Lind & Ponack

[57] ABSTRACT

An apparatus for controlling a blower motor composed of a brushless motor is operative to control the blower motor, in the pulse width modulation (PWM) mode, with a number of pulses which are inversely proportional to a setting speed so as to reduce the motor operation noise and power consumption. An appropriate selection of the waveform to be supplied to the blower motor or the disturbance of the exciting timing of an exciting coil of the blower motor is effective to prevent the occurrence of a resonance phenomenon caused by vibrations produced by the blower motor.

4 Claims, 16 Drawing Sheets

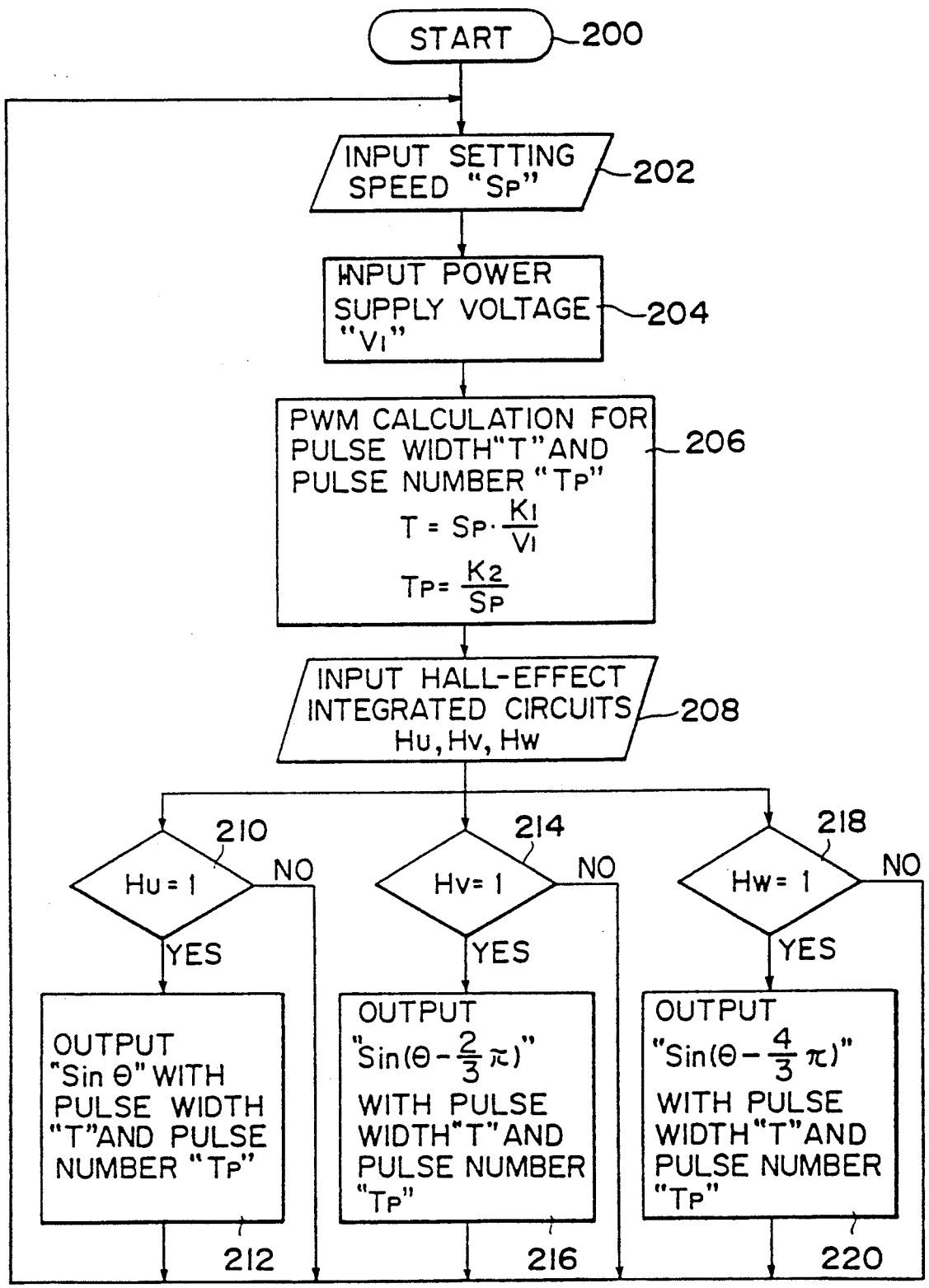

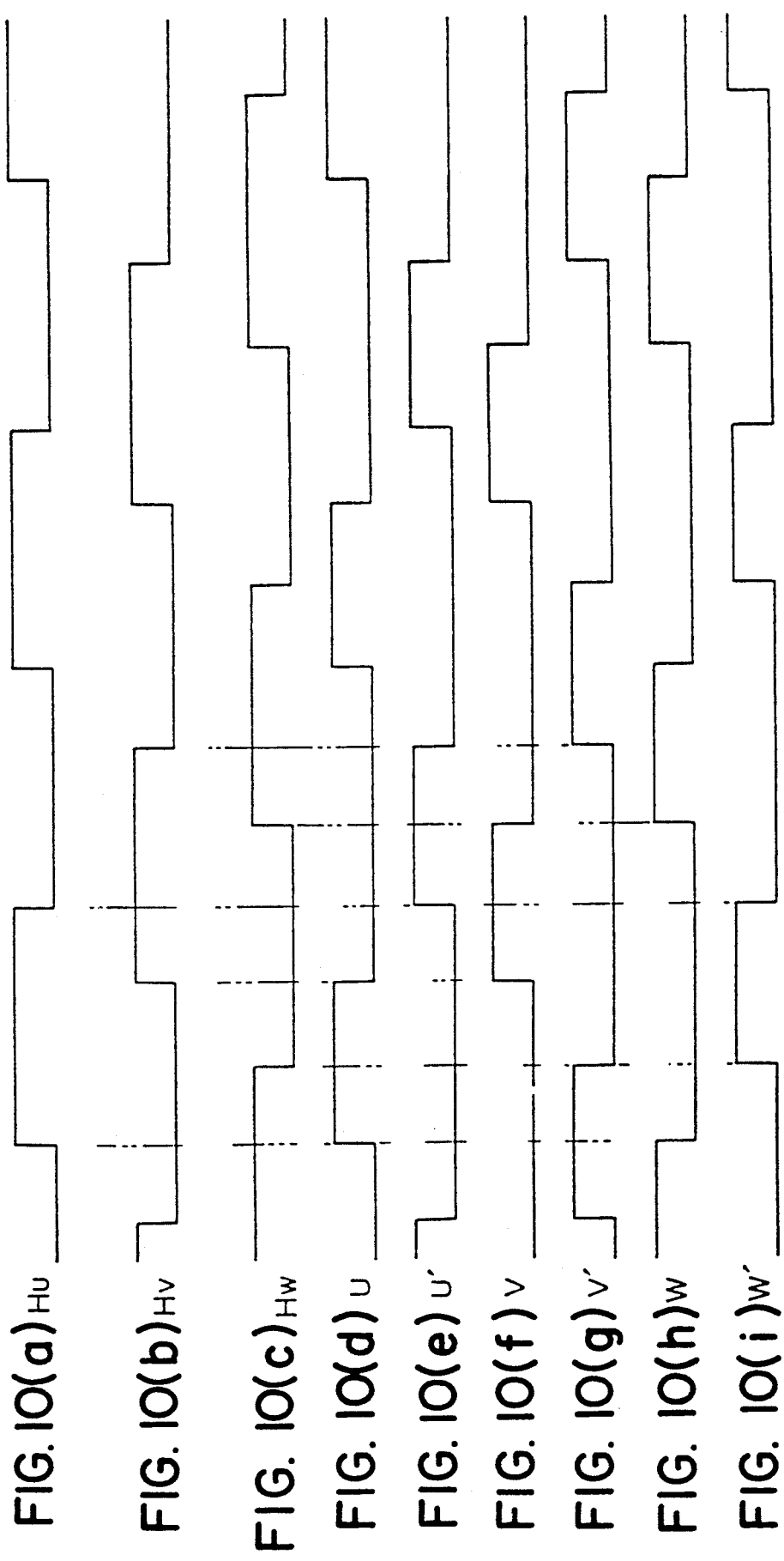

APPARATUS FOR CONTROLLING BLOWER MOTOR OF AUTOMOBILE AIR-CONDITIONER

BACKGROUND OF THE INVENTION

1. Field of the Invention

The present invention relates generally to the control of a blower motor, and more particularly to an apparatus for controlling such a blower motor composed of a brushless motor.

2. Description of the Prior Art

In recent years, a demand for a silent vehicle passenger compartment has greatly increased with a prolonged service life of motor vehicles. This demand involves a study of sound reduction of a blower motor operating as a noise generating source. The conventional blower motor is of the type having brushes and due to this structure, the brush motor has its limit on the reduction of the noise level. With this difficulty in view, an attempt has been made to use brushless motors as blower motors as a steady progress is being made in reducing the size and cost of the brushless motors. The rotation of such brushless motors is generally controlled by a pulse width modulation (PWM) control system such as disclosed Japanese Laid-open Patent Publication No. 58-172993.

In this PWM control system, electrical power is consumed when a power transistor used for energizing an exciting coil is turned on and off in response to the rising and falling of a pulse signal. Such power consumption increases with an increase in the pulse repetition frequency so that the PWM control system fails to satisfy the need for energy savings and brings about deterioration of the power transistor due to an increased heat generation.

On the other hand, as regard to the function of the blower motor, a high pulse repetition frequency obtained in the PWM control system is preferable because a silent operation can be obtained at a low speed rotation. While the blower is rotating at a low speed, wind noise is small and the noise produced inside the motor is not offensive to the ear. The internal motor noise is a vibratory sound of wires generated by alternating magnetic flux passing through the exciting coil. The vibratory sound level tends to increase as the repetition frequency of the PWM control is increased in such a manner that the average electrical power applied to the exciting coil approximates a sine wave.

However, when the blower is driven at a high speed while keeping the pulse repetition frequency at a high frequency level, a problem arises in that the power consumption increases considerably and the deterioration of the power transistor is accelerated.

In the case of the brushless motor, the generation of a slight operation noise is inevitable. The operation noise is caused by vibrations produced when the brushless motor is rotating. Japanese Laid-open Patent Publication No. 62-152695 discloses a sound reduction technology in which the decrease in the electrical current flowing through the motor windings when a motor-driving transistor is turned off is made gentle to thereby lower the vibratory noise produced from a stator block at the time of switching of the electrical current.

According to the foregoing technology, the noise level resulting from vibration of the stator block can be reduced to a minimum by slowing down the decrease in the electrical current flowing through the motor windings, i.e. by reducing changes in the magnitude of the magnetic flux. The prior sound reduction technology is however unsatisfactory in that noise resulting from resonance cannot be reduced.

It has been experienced that a motor of this type generates a so-called "beat" sound due to the electromagnetic action in windings when they are energized. When the motor is used as a blower motor and is driven at a relatively high speed of rotation, the user does not receive an unpleasant noise because the beat sound is canceled out by the wind sound and air-flow sound of the fan. However, when the motor is rotating at a low speed, the wind noise is relatively low and the "beat" noise level exceeds the wind noise level. As a result, the user feels uncomfortable.

SUMMARY OF THE INVENTION

With the foregoing difficulties in view, it is an object of the present invention to provide an apparatus for controlling a blower motor while reducing the operation noise to a silent level and controlling the power consumption.

Another object of the present invention is to provide a blower motor controlling apparatus, which is capable of reducing noise generated due to the resonance phenomenon when the blower motor is rotating.

A further object of the present invention is to provide a blower motor controlling apparatus, which is capable of maintaining the high-speed rotation characteristics while preventing the generation of "beat" noise which would otherwise occur when the blower is rotated at a low speed.

According to a first aspect of the present invention, there is provided an apparatus for controlling a blower motor, comprising: drive condition deciding means for deciding a driving condition of a blower motor composed of a brushless motor based on at least a target rotational speed of the blower motor; an exciting timing deciding means for deciding the exciting timing of an exciting coil of the blower motor substantially inversely proportional to the target rotation speed; and a driving means for driving the blower motor based on output signals from the drive condition deciding means and the exciting timing deciding means.

With this construction, when the target rotational speed of the blower motor is set at a high level, the exciting timing deciding means excites the exciting coil of the blower motor at a low repetition frequency. On the other hand, when the target rotational speed is set at a low level, the exciting timing deciding means retards the exciting timing of the exciting coil of the blower motor by using a high pulse repetition frequency. Since the exciting timing is accelerated when the target rotational speed is low, the rate of change of the exciting current flowing through the exciting coil becomes small with the result that the beat noise produced at the time of energization of the exciting coil is reduced. On the other hand, when the target rotational speed is high, the number of on-off operations of the driving means is reduced.

According to a second aspect of the present invention, there is provided an apparatus for controlling a blower motor, comprising: a rotation deciding means for deciding a rotational speed of a blower motor composed of a brushless motor; an exciting timing deciding means for deciding the exciting timing of an exciting coil of the blower motor; driving means for driving the blower motor based on an output signal from the rotation deciding means and an output signal from the exciting timing deciding means; and a signal disturbance means for disturbing the output signal from the rotation deciding means plural times while the blower motor is being driven.

According to a third aspect of the present invention, there is provided an apparatus for controlling a blower motor, comprising: a rotation deciding means for deciding a rotational speed of a blower motor composed of a brushless motor; an exciting timing deciding means for deciding the exciting timing of an exciting coil of the blower motor; a driving means for driving the blower motor based on an output signal from the rotation deciding means and an output signal from the exciting timing deciding means; and a timing disturbance means for disturbing the output signal from the exciting timing deciding means a plural number times while the blower motor is being driven.

With the signal disturbance means or the timing disturbance means thus provided, the output signal from the rotation deciding means or the output signal from the exciting timing deciding means is disturbed, so that the rotating condition of the blower motor is disturbed. This interrupts the stationary state of generation of a particular oscillation frequency which will causes resonance of vibrations.

According to a fourth aspect of the present invention, there is provided an apparatus for controlling a blower motor, comprising: a voltage waveform selecting means for selecting a voltage waveform to be supplied to a blower motor composed of a brushless motor in correspondence to either a target rotational speed of the blower motor or a current rotational speed of the blower motor and the outputting the thus selected voltage waveform; and a driving means for driving the blower motor according to an output from the voltage waveform selecting means.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 4 is a flowchart showing a control routine achieved by a microcomputer incorporated in the blower motor controlling apparatus;

FIGS. 10(a)-10(i) are timing charts showing the relationship between the detected waveforms of the Hall-effect integrated circuits (ICs) shown in FIG. 9 and the switching timing of a 3-phase inverter circuit;

DETAILED DESCRIPTION

Figure 1:
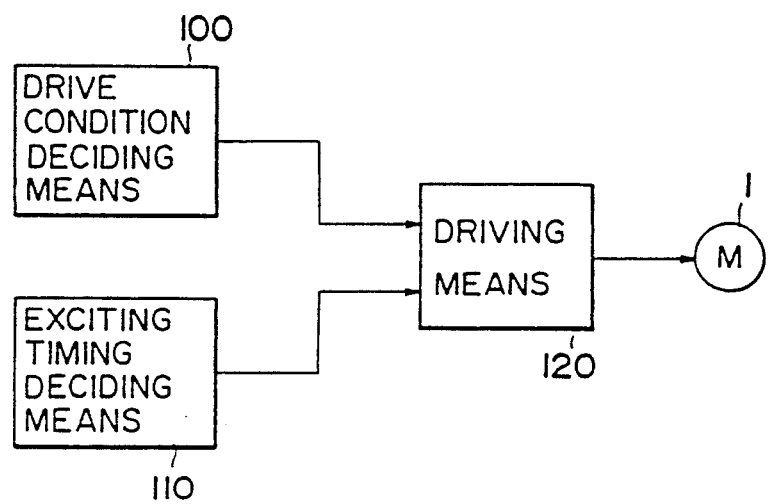
FIG. 1 is an operational block diagram of an apparatus for controlling a blower motor according to a first aspect of the present invention.

The general construction of an apparatus for controlling a blower motor according to a first aspect of the present invention will be described below with reference to FIG. 1.

The apparatus generally comprises a drive condition deciding means 100 for deciding a driving condition of a brushless motor 1 composed of a brushless motor based on at least a target rotational speed of the blower motor, an exciting timing deciding means 110 for deciding the exciting timing of an exciting coil of the blower motor 1 substantially inversely proportional to the target rotation speed, and a driving means 120 for driving the blower motor 1 based on output signals from the drive condition deciding means 100 and the exciting timing deciding means 110.

Structural details of the apparatus will be described below with reference to FIG. 2.

The blower motor control apparatus is so constructed as to control a three-phase inverter circuit 8 for energizing an exciting coil 1a of the blower motor 1 using a microcomputer 5.

The blower motor 1 is employed to drive a sirocco fan (not shown) disposed at an upstream side of an airflow duct (not shown) of an automobile air-conditioner, for example. The blower motor 1 comprises a brushless motor.

The brushless motor is of the construction known per se including a rotor formed of a permanent magnet, a stator coil for producing a rotating magnetic field, and Hall-effect elements. No particular arrangement is needed for the brushless motor to fit the same to the apparatus of the present invention.

The apparatus includes a speed setter 2 for setting the speed of rotation of the blower motor 1. The speed setter 2 is composed of a variable resistor having a slidably movable terminal 2a from which an output voltage is delivered to an analog-to-digital (A/D) converter 3. The A/D converter 3 converts the thus received voltage signal into a digital signal which in turn is inputted into a microcomputer 5.

The microcomputer 5 is of the construction known per se including a central processing unit (CPU), a read only memory (ROM), a random access memory (RAM), an input/output port, etc.

Designated by 4a–4c are Hall ICs (integrated circuits) disposed inside the brushless motor constituting the blower motor 1 for detecting the position of switching or shifting of the rotor polarity. The Hall ICs 4a–4c are so constructed as to output TTL (transistor-transistor logic) level pulse signals. In the illustrated embodiment, the brushless motor has a three-phase construction and hence the Hall ICs 4a–4c are disposed adjacent to a rotor of the three-phase brushless motor at equal circumferential intervals of 120 degrees. Output signals $H_U$, $H_V$ and $H_W$ of the respective Hall ICs 4a–4c are supplied directly to the microcomputer 5.

An analog-to-digital (A/D) converter 6 is connected in circuit with a direct-current power supply 7 and the microcomputer 5 for converting power supply voltage into digital values and outputting the same to the microcomputer 5.

Figure 3A:
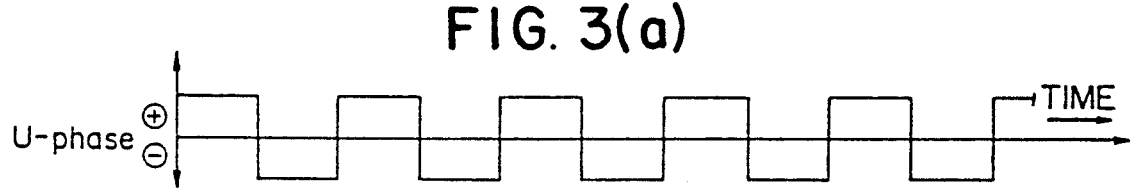
FIGS. 3(a)-3(c) are timing charts showing the timing of input signals of a 3-phase inverter circuit incorporated in the apparatus.
Figure 3B:
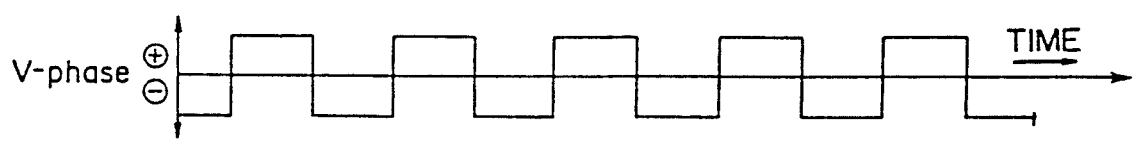
Figure 3C:
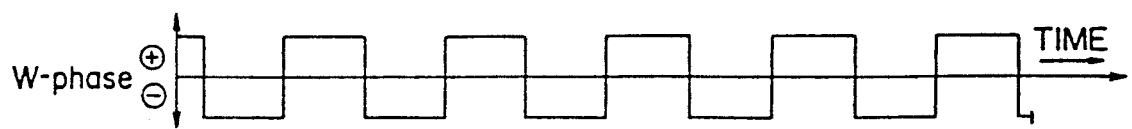

The microcomputer 5 is of the construction known per se including a central processing unit (CPU), a read-only memory (ROM), a random access memory (RAM), an input-output port (IO), etc. The microcomputer 5 serves to produce timing signals shown in FIGS. 3(a)–3(c) based on the detected signals from the Hall ICs 4a–4c which are needed for the control of the exciting timing of the brushless motor in a well known manner. The microcomputer 5 further serves to output pulse signals to the three-phase inverter circuit 8 according to a predetermined program described later for changing the operating condition of the three-phase inverter circuit 8 to thereby control the operation of the blower motor 1.

The three-phase inverter circuit 8 is a transistor circuit known per se and constructed to supply three-phase exciting current to the exciting coil 1a of the blower motor 1. In the illustrated embodiment, the inverter circuit 8 is composed of power MOSFETs (metal-oxide-silicone field-effect transistors).

FIG. 4 shows a flowchart achieved by the microcomputer 5 for the control of operation of the brushless motor 1 according to the present invention. The illustrated control is a PWM (pulse width modulation) control system well known as a control system for the inverter circuits. In the PWM control system, the pulse number speed is varied with the number of rotation, as described below.

The microcomputer 5 starts its control routine in a step 200. Then, the control proceeds to a step 202 to input a setting speed $S_p$ from the speed setter 2 via the A/D converter 3.

The step 202 is followed by a step 204 in which a power supply voltage $V_1$ is input via the A/D converter 6. Then, the control advances to a step 206.

The step 206 calculates a pulse width or duration T and a pulse number $T_p$ for PWM control according to the following expressions (1) and (2).

$$T = S_p \cdot \frac{K_1}{V_1} \quad (1)$$

$$T_P = \frac{K_2}{S_p} \quad (2)$$

where $S_p$ is the setting speed inputted in the step 202, $V_1$ is the power supply voltage inputted in the step 204, and $K_1$ and $K_2$ are calculation coefficients. $T_p$ is the number of pulses per half cycle.

Thereafter, the control advances to a step 208 which inputs the detected signals $H_U$, $H_V$ and $H_W$ from the respective Hall ICs 4a–4c. The step 208 is followed by the following steps 210–220.

In FIG. 4, these steps 210–220 are described as being achieved in a parallel manner for purposes of explanation that control substantially the same operations are achieved with respect to each of the three-phases of the brushless motor 1. However, in practice, the steps are achieved by a serial operation.

The step 210 determines whether or not $H_U$ is a "1". If yes ($H_U=1$), then the control advances to the step 212 which outputs a rectangular pulse signal to the U-phase (U"+" side or U⊕ side or U⊖ side in FIG. 2) of the three-phase inverter circuit 8 in synchronism with sin⊖ and with the pulse width T and the pulse number $T_p$ calculated in the step 206. Thereafter, the control returns to the step 202 and the foregoing steps of operation are repeated.

If no ($H_U{\neq}1$), the control jumps over the step 212 and returns to the step 202.

The step 214 determines whether or not $H_V$ is a "1". If yes ($H_V=1$), then the control advances to the step 216 which outputs a rectangular pulse signal to the V-phase (V"+" side or V⊕ side or U⊖ side in FIG. 2) of the three-phase inverter circuit 8 in synchronism with $\sin(\ominus - \tfrac{2}{3}\pi)$ with the pulse width T and the pulse number $T_p$ in the same manner as done in the step 212. After this step 216 is completed, or in the case where the result of judgment in the step 214 is "no" ($H_V{\neq}1$), the control returns to the step 202.

The step 218 judges whether $H_W$ is "1" or not. If yes ($H_W=1$), then the control advances to the step 220 which outputs a rectangular pulse signal to the W-phase (W"+" side or V⊕ side or W⊖ side in FIG. 2) of the three-phase inverter circuit 8 in synchronism with $\sin(\ominus - \tfrac{4}{3}\pi)$ with the pulse width T and the pulse number $T_p$ in the same manner as done in the step 212. After this step 218 is completed, or in the case where the result of judgment in the step 218 is "no" ($H_W{\neq}1$), the control returns to the step 202.

Figure 5A:
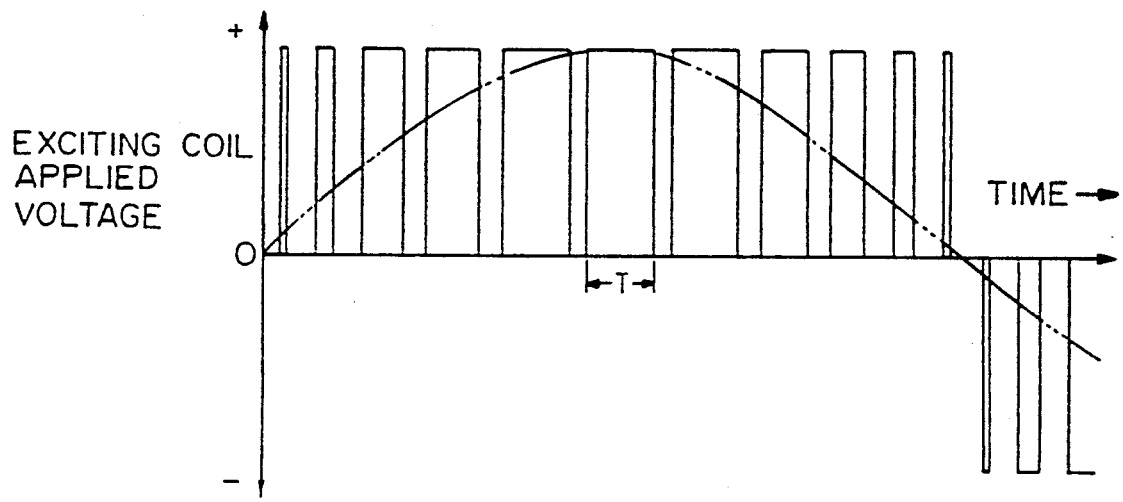
FIGS. 5(a) and 5(b) are graphs showing voltage waveforms to be supplied to an exciting coil of the blower motor.
Figure 5B:
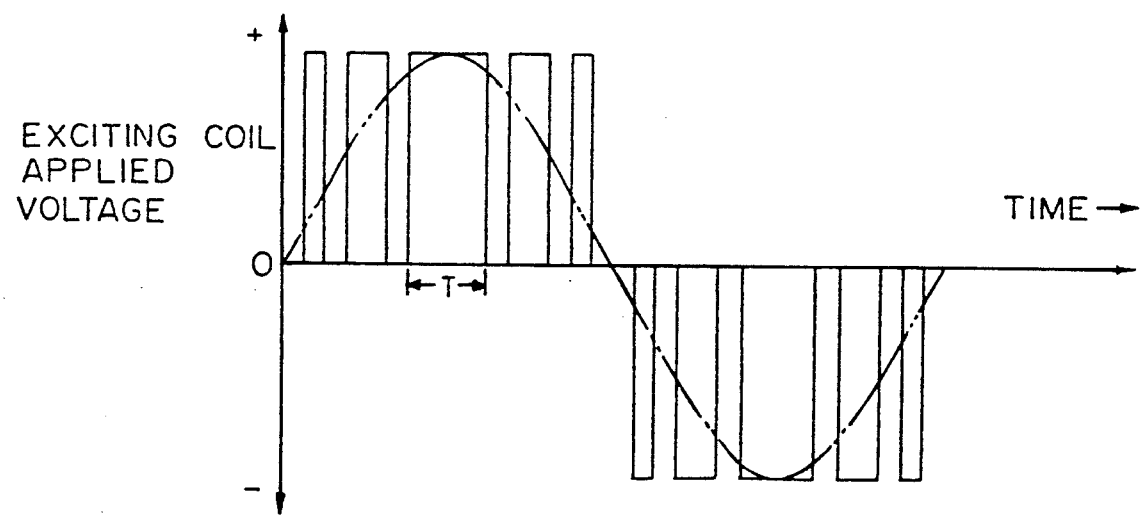

With the control program thus proceeded, to the exciting coil 1a of the blower motor 1, rectangular pulse signals shown in FIGS. 5(a) and 5(b) are supplied according to the rotational speed. That is, at a relatively low speed, the pulse number $T_p$ per half cycle is larger than that at a high speed rotation shown in FIG. 5(b), so that the average power consumption per unit time is kept constant irrespective of the rotational speed of the blower motor 1.

In each of FIGS, 5(a) and 5(b), a sine waveform shows an applied electrical power obtained by integrating the rectangular signal pulses.

Figure 6:
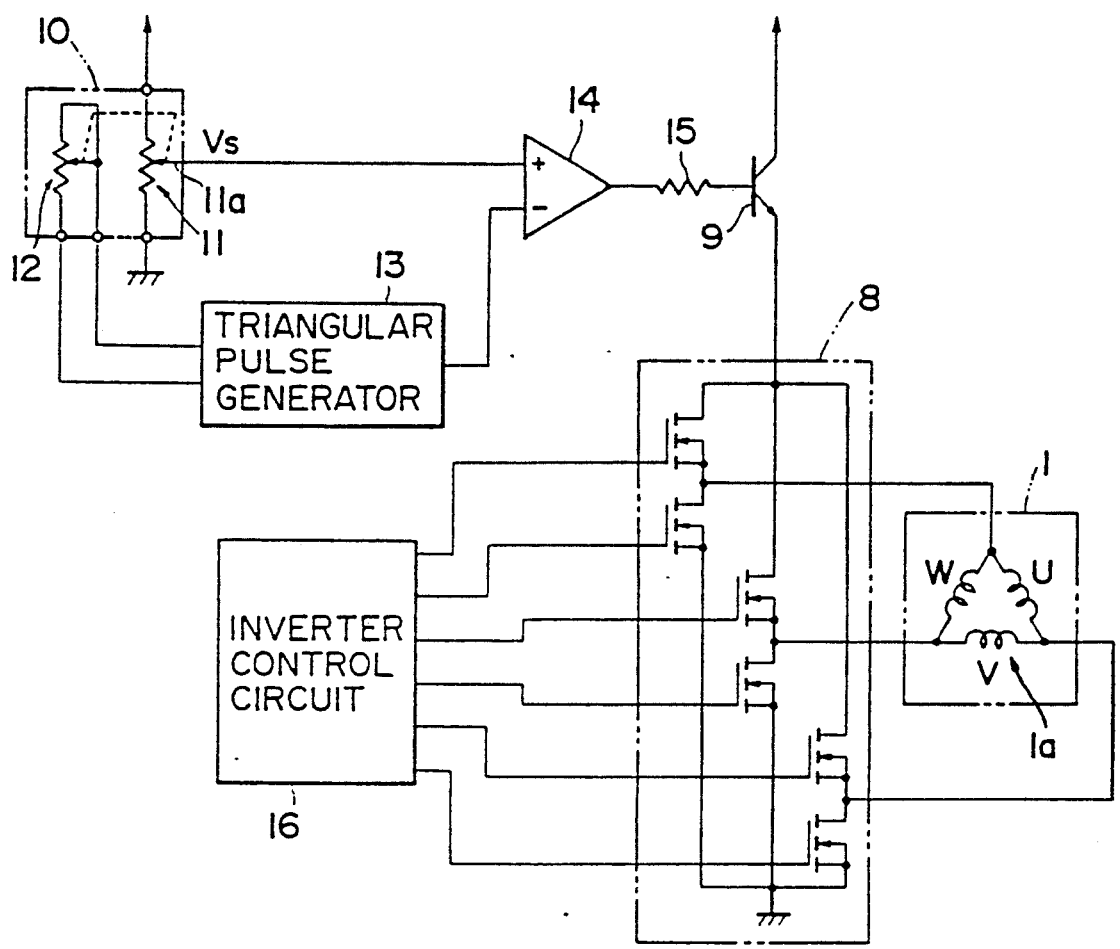
FIG. 6 is a circuit diagram showing a second embodiment of the apparatus shown in FIG. 1.

A description follows for a second embodiment of the present invention as shown in FIG. 6.

The illustrated embodiment includes a power control transistor 9 connected in series with a three-phase inverter circuit 8 and a power supply (not shown) and adapted to be turned on and off according to the motor rotational speed. These components which correspond to those of the first embodiment described above are designated by like or corresponding reference characters and hence a further description will only be provided for those elements which are different from those of the first embodiment.

A setter 10 sets a rotational speed of the blower motor 1 and an oscillating frequency of a triangular wave pulse generator 13 described later. The setter 10 is composed of first and second variable resistors 11 and 12 interlocked together. The first variable resistor corresponds to the speed setter 2 in the first embodiment, while the second variable resistor 12 is provided to regulate the oscillating frequency of the triangular wave pulse generator 13.

Figure 7:
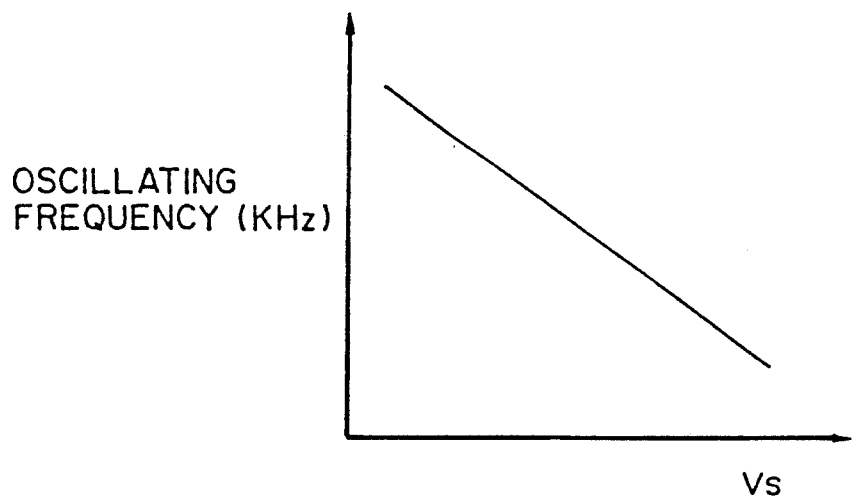
FIG. 7 is a graphical representation of the oscillation frequency characteristics of a triangular pulse generator incorporated in an apparatus of the second embodiment of the present invention.

The triangular wave pulse generator 13 is of the construction known per se including transistors or operational amplifiers. The triangular wave pulse generator 13 is connected to the second variable resistor 12 in such a manner that the oscillating frequency of a triangular wave pulse generated by the pulse generator 13 decreases with an increase in setting speed set by the first variable resistor 11, as shown in FIG. 7. In FIG. 7, $V_s$ is a voltage (corresponding to the setting speed) drawn from a slidable terminal 11a of the first variable resistor 11.

Referring back to FIG. 6, element 14 is a comparator having a positive input terminal connected to the slidable terminal 11a of the first variable resistor 11. The negative input terminal of the comparator 14 is connected to the triangular wave pulse generator 13 to receive the output signal of the pulse generator 13.

With this arrangement, the comparator 14 outputs from its output terminal a rectangular pulse signal whose repetition frequency decreases as the setting speed is increased by the first variable resistor 11.

An inverter control circuit 16 provided for controlling the input side of the three-phase inverter circuit 8 uses the microcomputer 5 described above. It may be composed of a conventional electronic circuit other than the microcomputer 5.

A description follows for an apparatus for controlling a blower motor according to a second aspect of the present invention.

Figure 8:
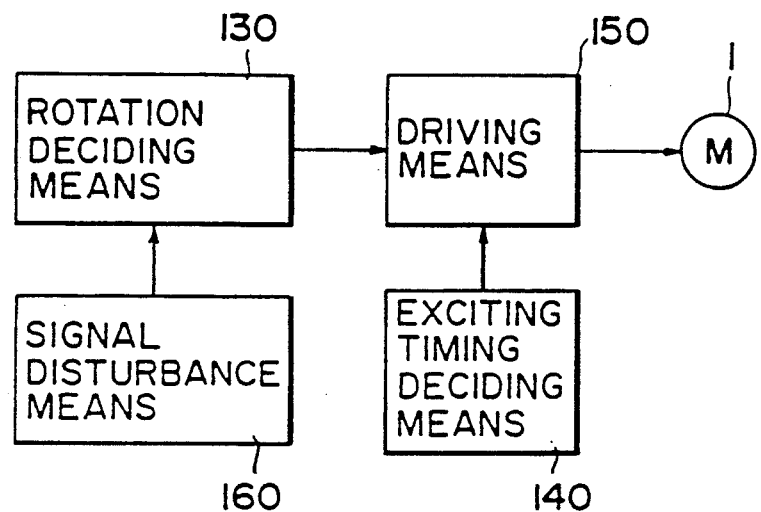
FIG. 8 is a functional block diagram showing the general construction of a blower motor controlling apparatus according to a second aspect of the present invention.

The blower motor control apparatus comprises, as shown in FIG. 8, a rotation deciding means 130 for deciding a rotational speed of a blower motor 1 composed of a brushless motor; an exciting timing deciding means 140 for deciding the exciting timing of an exciting coil of the blower motor 1; a driving means 150 for driving the blower motor 1 based on an output signal from the rotation deciding means 130 and an output signal from the exciting timing deciding means 140, and a signal disturbance means 160 for disturbing the output signal from the rotation deciding means 130 a plural number of times while the blower motor 1 is being driven.

Figure 9:
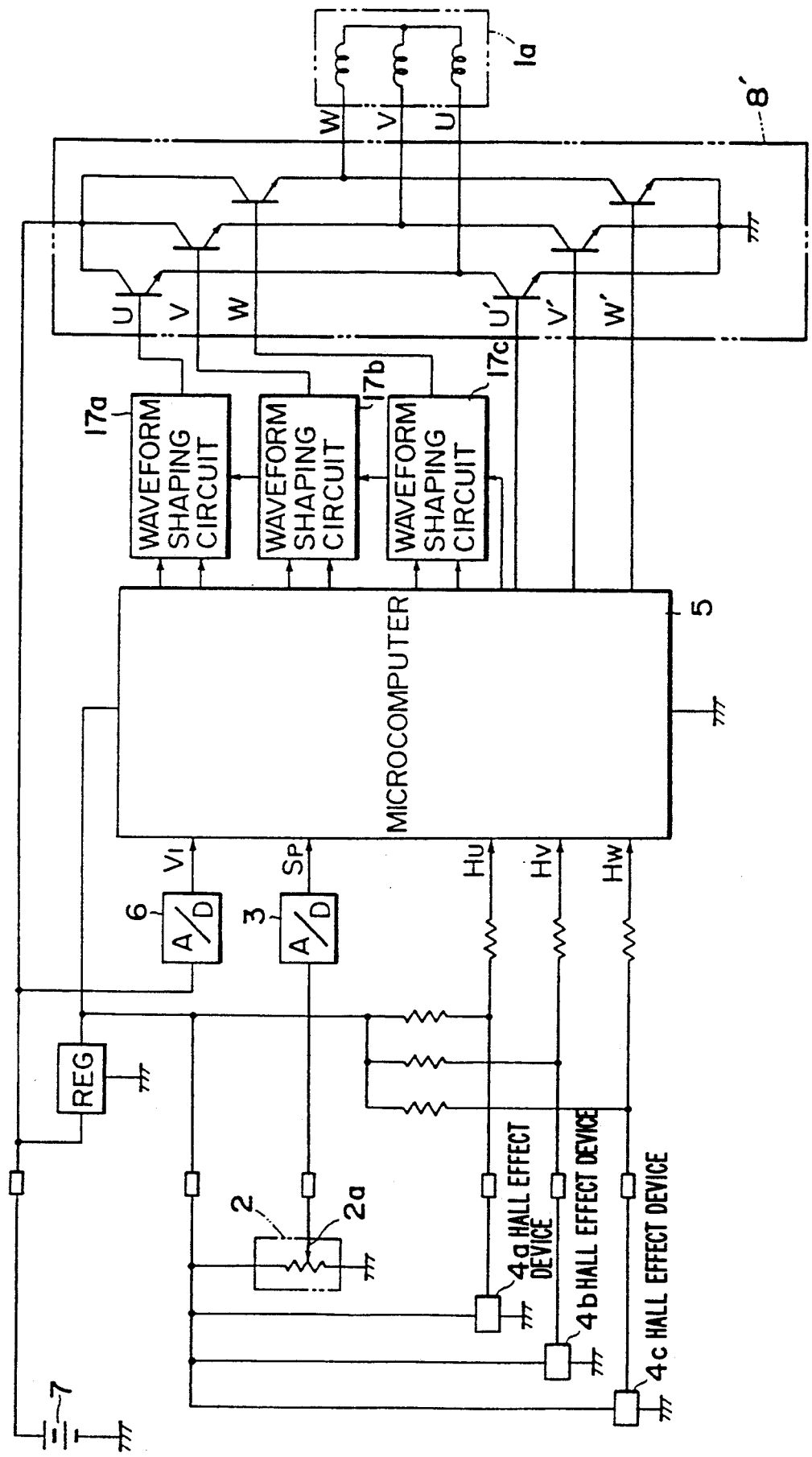
FIG. 9 is a circuit diagram of the apparatus shown in FIG. 8.

FIG. 9 shows the general construction of the apparatus shown in FIG. 8. In FIG. 9, these components which correspond to those shown in FIG. 2 are designated by like or corresponding reference characters, and hence a description will be provided for those elements of the arrangement which are different from those of the arrangement shown in FIG. 2.

The apparatus includes a microcomputer 5 which is so constructed as to produce timing signals shown in FIGS. 10(a)–10(i) necessary for controlling the exciting timing of the brushless motor in a well known manner and also to vary the waveform and level of input signals to be inputted to a three-phase inverter circuit 8' via three waveform shaping circuits 17a–17c for controlling operation of the blower motor 1 according to a predetermined control program.

The waveform shaping circuits 17a–17c which are connected between the three-phase inverter circuit 8' and the microcomputer 5 generate input signals to be supplied to the three-shape inverter circuit 8' according to the control signals from the microcomputer 5. The three waveform shaping circuits 17a–17c have a same construction.

Figure 2:
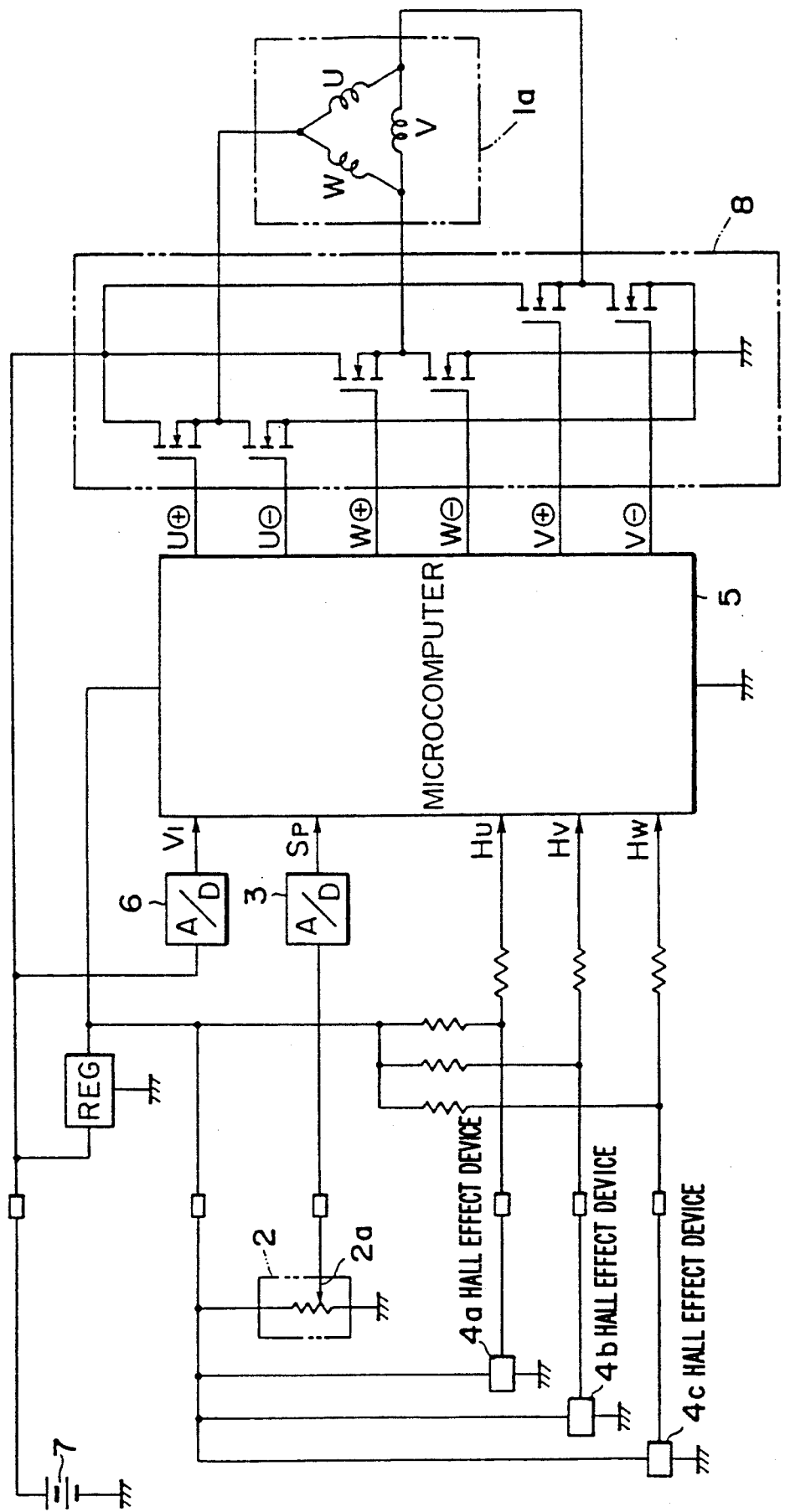
FIG. 2 is a circuit diagram showing a first embodiment of the apparatus shown in FIG. 1.

The three-phase inverter circuit 8' supplies exciting current to the exciting coil 1a of the blower motor 1 and is substantially the same as the three-phase inverter circuit 8 shown in FIG. 2 except that it is composed of general power transistors.

When a direct-current power supply 7 is turned on to energize the microcomputer 5, the waveform shaping circuits 17a–17c supply signals to the three-phase inverter circuit 8' depending on the setting of the speed setter 2 whereupon exciting current is supplied to the exciting coil 1a, thereby rotating the blower motor 1. The microcomputer 5 controls the operating timing of the three-phase inverter circuit 17 based on the input signals $H_U$, $H_V$ and $H_W$ from the respective Hall ICs 4a–4c so that the blower motor 1 is rotated at a predetermined constant speed.

Waveforms as shown in FIGS. 11 through 13 are formed by the waveform shaping circuits (17a, 17b, 17c) that are controlled by the microcomputer (5). Each waveform shaping circuit has variation maps of waveforms, and one of the maps is selected responsive to a signal from the microcomputer (5). Therefore, a waveform output from each of the waveform shaping circuits, (17a, 17b, 17c) is deformed as shown in FIGS. 11 through 13.

Figure 11A:
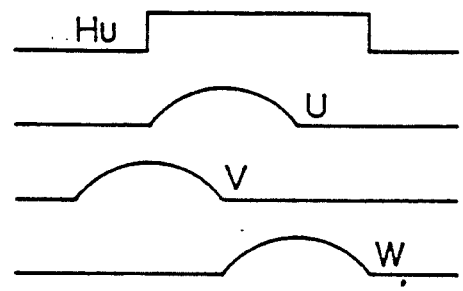
FIGS. 11(a) through 13(b) are waveforms showing output signals from waveform shaping circuits incorporated in the circuit shown in FIG. 9.
Figure 11B:
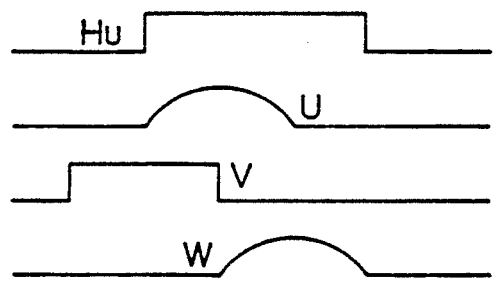
Figure 12A:
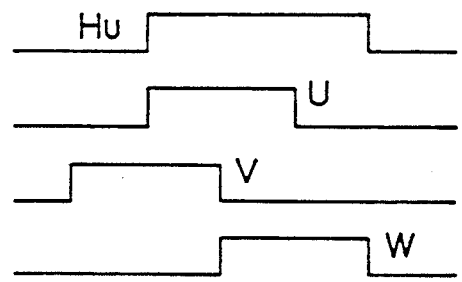
Figure 12B:
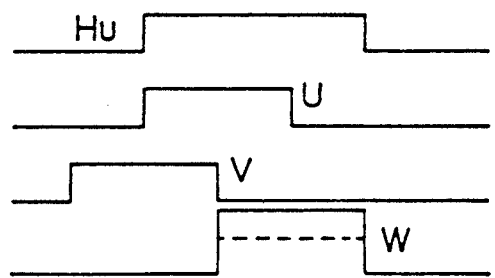

During operation of the blower motor 1, the waveform shaping circuit 17a–17c vary the waveform of the output signals either periodically or aperiodically (at random) as shown in FIGS. 11(a) and 11(b) based on the instructions received from the microcomputer 5. That is, in FIG. 11(a), the signal of each phase has a sine waveform, while in FIG. 11(b), the V-phase (corresponding to the output lines of the waveform shaping circuits 17a–17c) outputs a rectangular wave pulse signal.

In place of the foregoing waveform change, the W-phase voltage, for example, may be changed periodically or aperiodically as shown in FIGS, 12(a) and 12(b). As appears clear from FIGS. 12(a) and 12(b), the W-phase voltage is reduced to about ½ by the voltage change process.

Figure 13A:
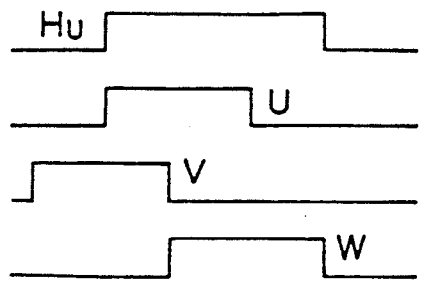
Figure 13B:
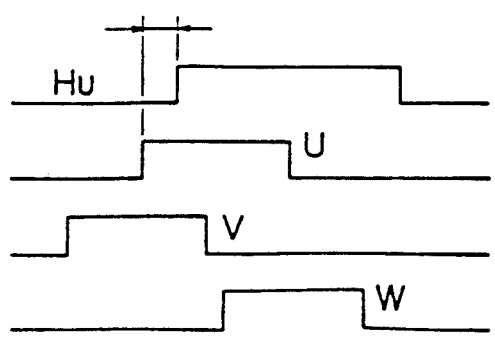

As a further alternative, the timing of the U-phase, for example, is changed periodically or aperiodically when diving the three-phase inverter circuit 8' as illustrated in FIGS. 13(a) and 13(b).

Figure 14:
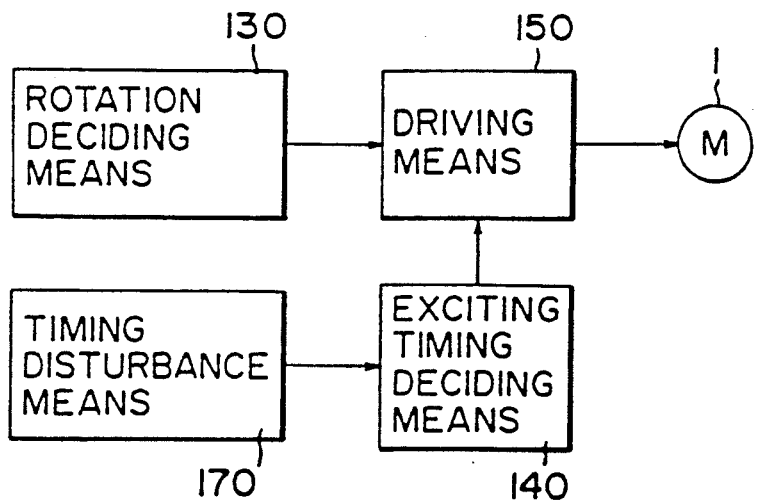
FIG. 14 is a functional block diagram showing the general construction of a blower motor controlling apparatus according to a third aspect of the present invention.

FIG. 14 shows an apparatus for controlling a blower motor provided in accordance with a third aspect of the present invention.

The apparatus comprises a rotation deciding means 130 for deciding a rotational speed of a blower motor 1 composed of a brushless motor; an exciting timing deciding means 140 for deciding the exciting timing of an exciting coil of the blower motor 1; an driving means 150 for driving the blower motor 1 based on an output signal from the rotation deciding means 130 and an output signal from the exciting timing deciding means 140, and a timing disturbance means 170 for disturbing the output signal from the exciting timing deciding means 140 a plural number of times while the blower motor is being driven.

The apparatus practically employs the construction of the apparatus shown in FIG. 2 and hence a further description is no longer necessary so far as the construction of the apparatus is concerned. A description follows for a control routine shown in FIG. 15 achieved by the microcomputer 5 when the pulse width is aperiodically changed under PWM control of the microcomputer 5 to thereby energize the exciting coil 1a of the blower motor 1. The microcomputer 5 starts its control routine from a step 222. The control advances to a step 224 which inputs a setting speed $S_p$ from the speed setter 2 via the A/D converter 3.

The step 224 is followed by a step 226 which input a power supply voltage $V_1$ via the A/D converter 6. Then, the control advances to a step 226.

The step 226 calculates a pulse width or duration T under PWM control according to the following expression (1').

$$T = S_p \cdot \frac{K}{V_1} \qquad (1')$$

where $S_p$ is the setting speed inputted in the step 224, $V_1$ is the power supply voltage inputted in the step 226, and K is a calculation coefficient.

A step 230 generates a random number. Then the control advances to a step 232 which determines whether or not the random number generated in the step 230 is equal to a predetermined value y. If the generated random number is in equal to the predetermined value (YES), then the control goes on to a step 234 which starts a timer. When a predetermined period of time (about 1/1000 sec) set by the timer elapses, the control returns to the step 224 to repeat the foregoing steps of operation.

If the generated random number is not in equal to the predetermined value (NO), the control advances to a step 236 which inputs the detected signals $H_U$, $H_V$ and $H_W$ from the respective Hall ICs 4a–4c. The step 236 is followed by steps 238–248 described below.

Figure 15:
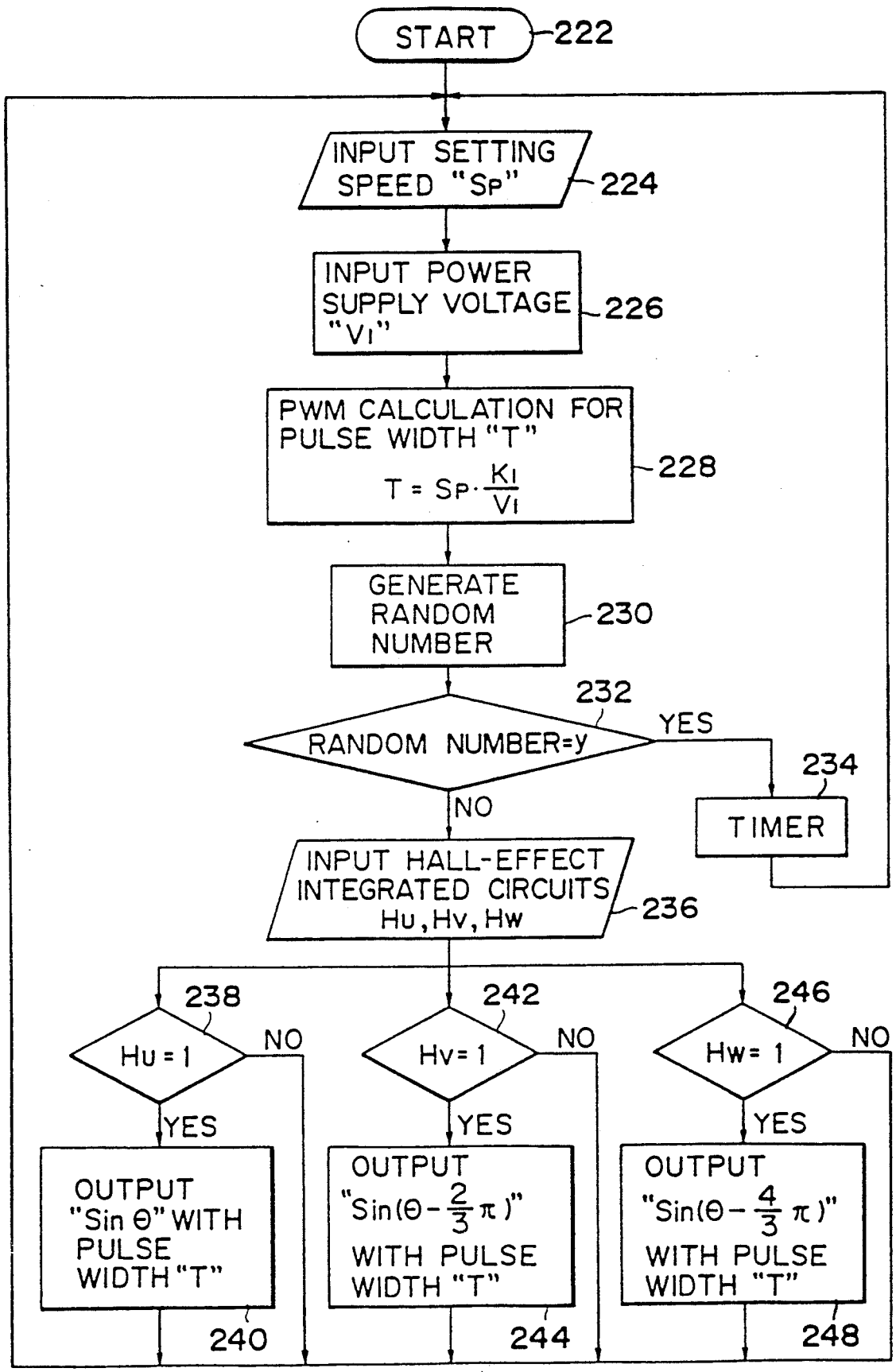
FIG. 15 is a flowchart showing a control routine achieved by a microcomputer incorporated in the blower motor controlling apparatus shown in FIG. 14.

In FIG. 15, these steps 238–248 are described as being achieved in a parallel manner for purposes of explanation such that the control of substantially the same operations are achieved with respect to each of a three-phases of the brushless motor 1. However, in practice, the steps are achieved by the serial operation.

The step 238 determines whether or not $H_U$ is a "1". If yes ($H_U=1$), then the control advances to the step 240 which outputs a rectangular pulse signal to the U-phase (U"+" side or U⊕ side or U⊖ side in FIG. 2) of the three-phase inverter circuit 8 in synchronism with sin⊖ and with the pulse width T calculated in the step 228. Thereafter, the control returns to the step 224 and the foregoing steps of operation are repeated.

If no ($H_U \neq 1$), the control jumps over the step 240 and returns to the step 224.

The step 242 judges whether $H_V$ is "1" or not. If yes ($H_V=1$), then the control advances to the step 244 which outputs a rectangular pulse signal to the V-phase (V"+" side or V⊕ side or U⊖ side in FIG. 2) of the three-phase inverter circuit 8 in synchronism with sin($\ominus - \frac{2}{3}\pi$) with the pulse width T in the same manner as done in the step 240. After this step 244 is completed, or in the case where the result of the determination in the step 242 is "no" ($H_V \neq 1$), the control returns to the step 224.

The step 246 determines whether $H_W$ is "1" or not. If yes ($H_W=1$), then the control advances to the step 248 which outputs a rectangular pulse signal to the W-phase (W"+" side or V⊕ side or W⊖ side in FIG. 2) of the three-phase inverter circuit 8 in synchronism with sin($\ominus - \frac{2}{3}\pi$) with the pulse width T in the same manner as done in the step 240. After this step 248 is completed, or in the case where the result of judgment the determination in the step 246 is "no" ($H_W \neq 1$), the control returns to the step 224.

Figure 16A:
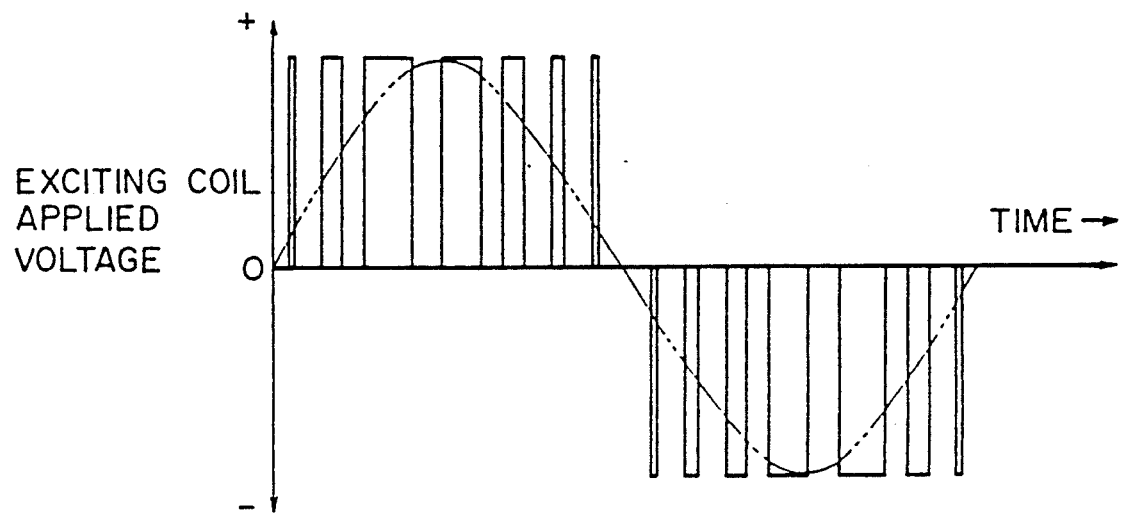
FIG. 16(a) is a graph showing a voltage waveform to be applied to an exciting coil of the blower motor according to the apparatus shown in FIG. 14.

With the control program thus proceeded, to the exciting coil 1a of the blower motor 1, a rectangular pulse signal synchronized with a sine wave as shown in FIG. 16(a) is supplied. Pulse widths of the individual rectangular pulse signals continuously change so long as the random number is not in equal to the predetermined value.

Figure 16B:
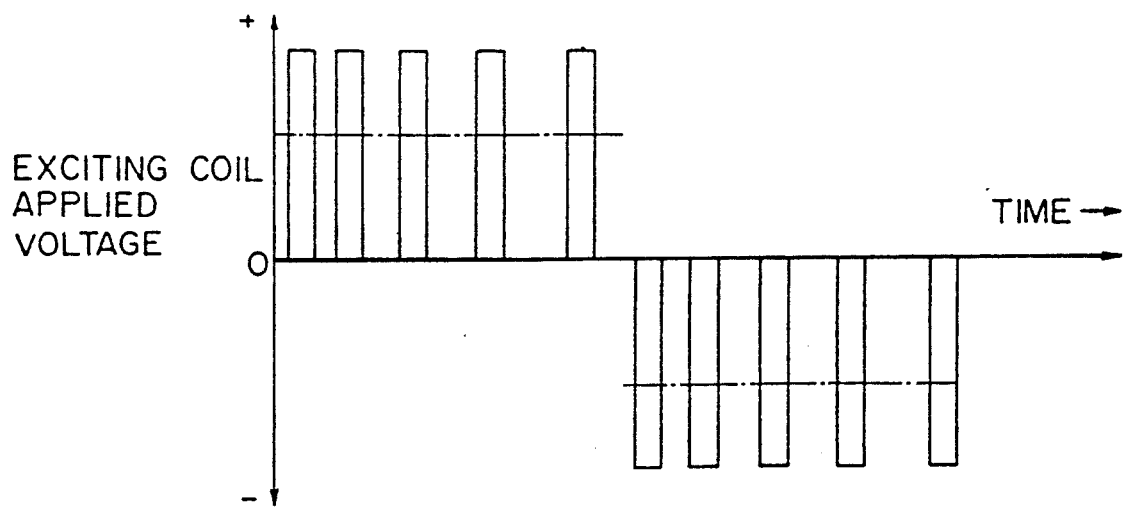
FIG. 16(b) is a graph showing another voltage waveform to be applied to the exciting coil of the blower motor according to the apparatus shown in FIG. 14.

The supplied exciting voltage averaged through the PWM control has a sine waveform as shown in FIG. 16(a). In place of this, the duty ratio control using a constant pulse width may be employed to obtain such an average exciting voltage as shown by the dash-and-dot lines in FIG. 16(b).

Figure 17:
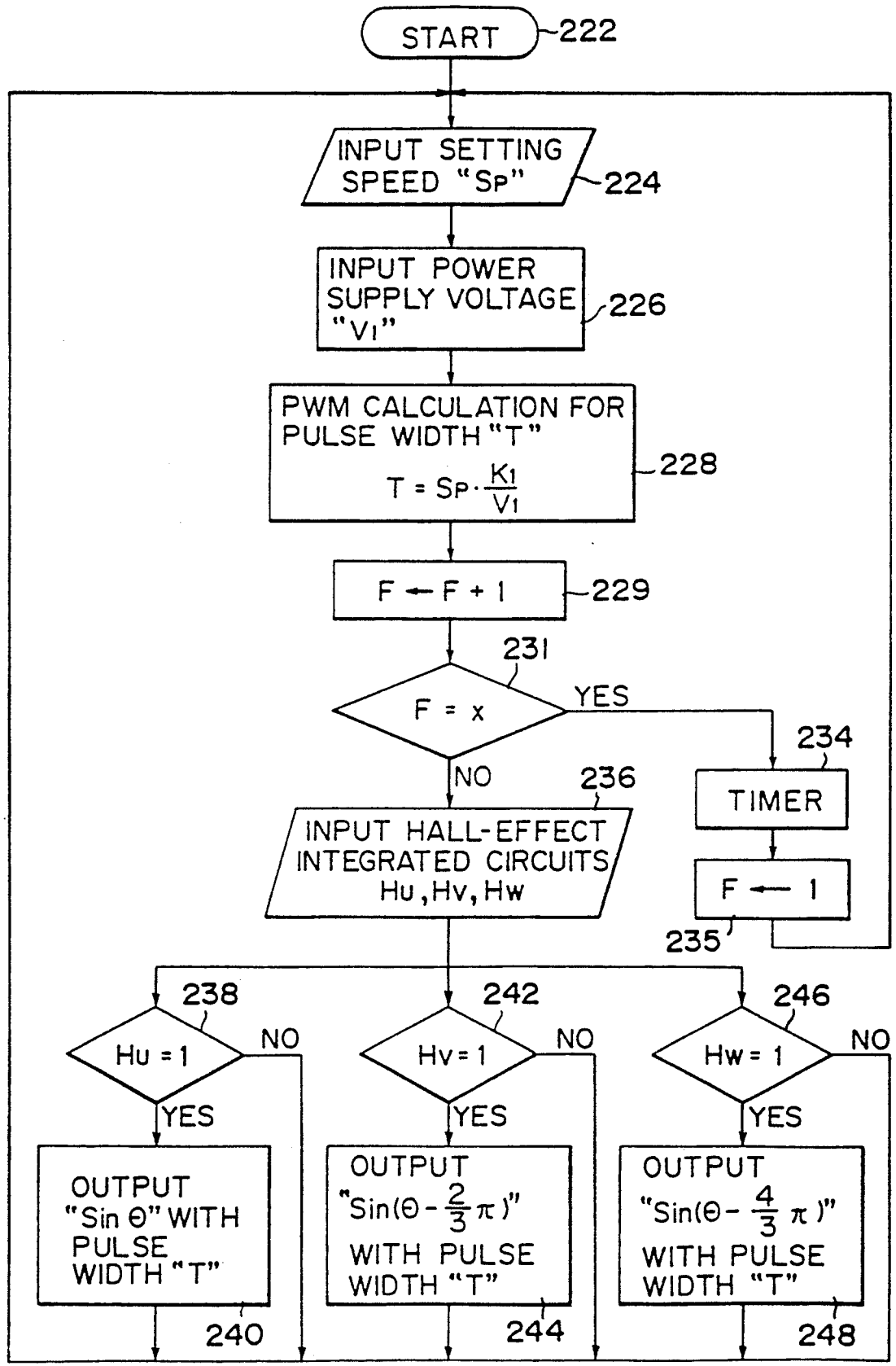
FIG. 17 is a flowchart showing a control routine achieved for the control of a blower motor according to another embodiment of the present invention.

Another embodiment according to the third aspect of the present invention will be described with reference to a flowchart shown in FIG. 17. These steps which correspond to these shown in FIG. 15 are designated by like or corresponding reference characters and hence a thereof is no longer necessary.

The second embodiment differs from the first embodiment in that the pulse width is changed periodically, as opposed to a random change of the pulse width in the first embodiment. To this end, a step 229 adds "1" to the variable F for integration. The control advances to a step 231.

The step 231 determines the variable F reaches a predetermined value x. If yes (F=x), then the control goes on to a step 234 which starts a timer. After a predetermined interval of time set by the timer elapses, the variable F is returned to "1" in a step 235. Thereafter, the control returns to the step 224.

If the result of the determination in the step 231 is no (F<x), the control advances to a step 236.

According to this embodiment, until the variable F reaches the predetermined value x, the PWM control is achieved with the pulse width T each time the step 228 is carried out, and after the variable reaches the predetermined value, the motor driving operation using the previous pulse width is maintained for a predetermined time period.

Figure 18:
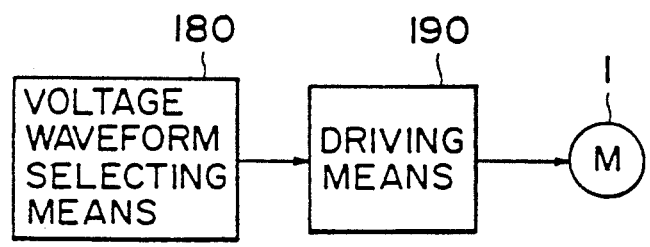
FIG. 18 is a functional block diagram of a blower motor controlling apparatus according to a fourth aspect of the present invention.

A description follows an of blower motor control apparatus provided in accordance with a fourth aspect of the present invention as shown in FIG. 18. The apparatus comprises a voltage waveform selecting means 180 for selecting a voltage waveform to be supplied to a blower motor 1 composed of a brushless motor in correspondence with either a target rotational speed of the blower motor 1 or a current rotational speed of the blower motor 1 and for outputting the thus selected voltage waveform, and a driving means 190 for driving the blower motor 1 according to an output from the voltage waveform selecting means 180.

Figure 19:
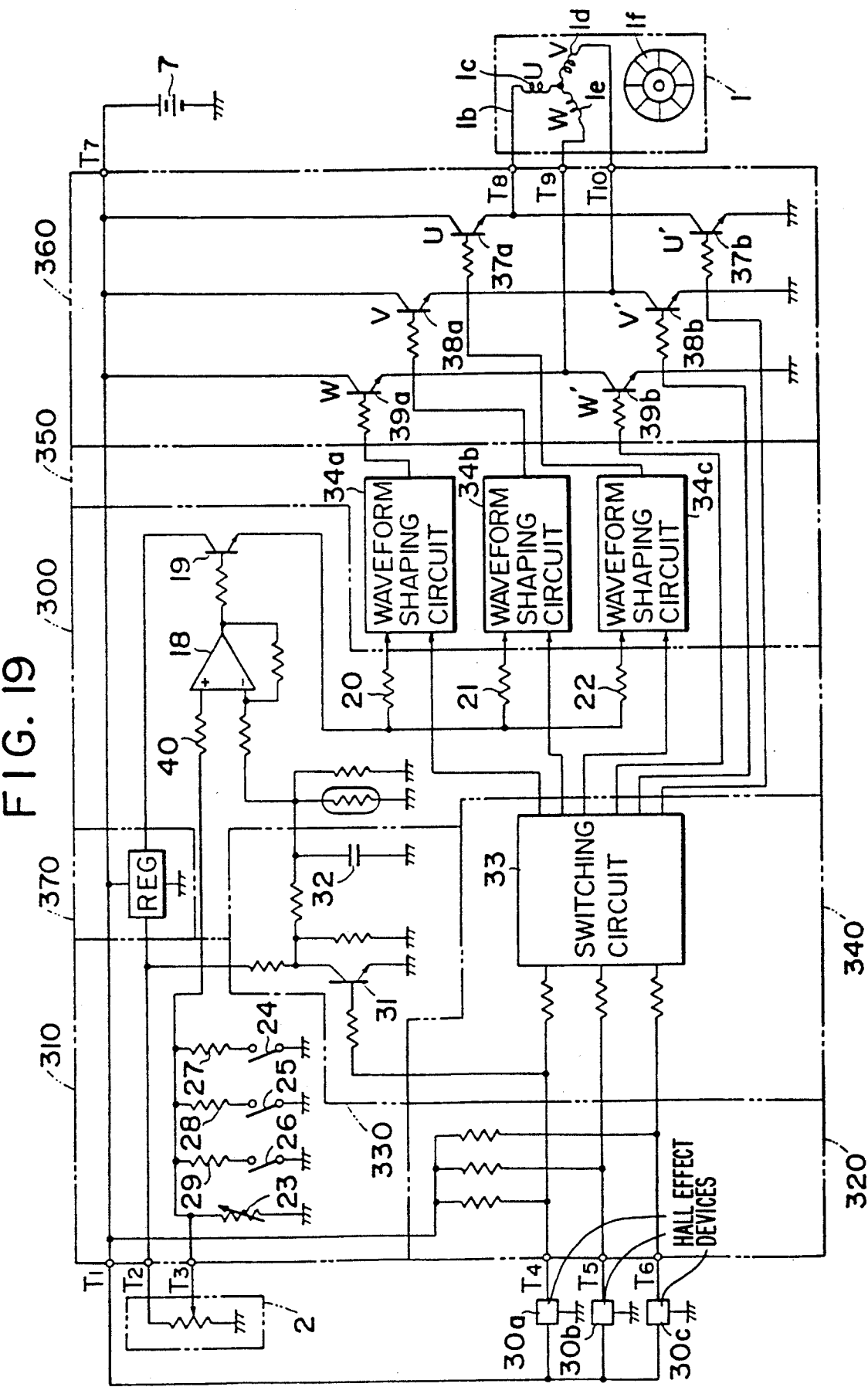
FIG. 19 is a circuit diagram showing a first embodiment of the apparatus shown in FIG. 18.

The apparatus, as best shown in FIG. 19, includes a rotational speed setting circuit 300, a rotational speed correcting circuit 310, a rotation detecting circuit 320, a F/V converting circuit 330, a switching control circuit 340, a drive input control circuit 350, a driving circuit 360, and a voltage-regulating transformer circuit 370. A speed setter 2 composed of a variable resistor is connected between external terminals $T_2$ and $T_3$. Connected between a common external terminal $T_1$ and three external terminals $T_4$, $T_5$ and $T_6$ are Hall-effect elements 30a, 30b and 30c which constitute part of the rotation detecting circuit 320. To an external terminal $T_7$, a direct-current power supply 7 is connected. To external terminals $T_8$–$T_{10}$, the blower motor 1 composed of a brushless motor is connected.

The rotational speed setting circuit 300 is provided for setting a rotational speed of the blower motor 1 and is comprises a differential amplifying circuit composed mainly of an operational amplifier 18, and a distributing circuit composed mainly of a transistor 19 disposed on the output side of the operational amplifier 18.

The operational amplifier 18 has a non-inverted input terminal to which the speed setter 2 supplies a voltage corresponding to the setting rotational speed. To the inverted input terminal of the operational amplifier 18, an output voltage (corresponding to the rotational speed of the rotor 1f of the blower motor 1) from a F/V converting circuit 330 is supplied. The base terminal of the transistor 19 received a voltage having been subjected to differential amplification. The transistor 19 outputs an output voltage from its emitter terminal to the drive input control circuit 350 via resistors 20–22.

The rotational speed correcting circuit 310 corrects the rotational speed set by the speed setter 2 so as to conform with the discharge mode of an automobile air-conditioner. To this end, the rotational speed correcting circuit 310 is connected to the non-inverted input terminal of the operational amplifier 18.

The rotational speed correcting circuit 310 includes a regulating variable resistor 23 connected between the external terminal $T_3$ and ground, a vent mode detecting switch 24, a defrost mode detecting switch 25 and a foot mode detecting switch 26 adapted to be closed depending on the discharge mode, these switches 24–26 being connected between the external terminal $T_3$ and the earth respectively through resistors 27–29.

In the vent mode, the vent mode detecting switch 24 is closed and the speed setter 2 sets a predetermined rotational speed. The discharge mode is changed to the defrost mode whereupon the vent mode detecting switch 24 is open and the defrost mode detecting switch 25 is closed to connect the resistor 28 between the external terminal $T_3$ and the earth. The resistance value of the resistor 28 is previously selected to correct or accommodate changes in rotational speed of the blower motor 1 which are caused by change in flow resistance due to the mode change. Thus, it is possible to prevent a drastic change in flow rate of the blower 1 which would otherwise be caused by changes in rotational speed.

Sensor portions of the respective detecting switches 24–26 are disposed in an appropriate positions adjacent to the corresponding mode doors (not shown) for detecting the position of the mode doors to close and open the detecting switches 24–26 depending on the positions of the mode doors.

The rotation detecting circuit 320 detects the rotational speed of the rotor 1f of the blower motor 1 and is composed mainly of three Hall-effect elements 30a–30c disposed adjacent to the rotor 1f via the external terminals $T_4$–$T_6$.

The Hall-effect elements 30a–30c comprise magnetic sensors known per se and are capable of outputting signal variable with the direction and magnitude of the external magnetic field.

The Hall-effect elements 30a–30c are adapted for three-phase windings of the stator coil 1b of the blower motor 1 and hence they are circumferentially spaced at equal intervals of 120 degrees. The first to third Hall-effect elements 30a–30c output timing signals shown in FIGS. 10(a)–10(c) in response to the rotation of the rotor 1f. In these figures, $H_U$ designates the output signal from the first Hall-effect element 30a, $H_V$ designates the output signal from the second Hall-effect element 30b, and $H_W$ designates the output signal from the third Hall-effect element 30c.

The F/V converting circuit 330 is of the construction known per se and operative to input the output signal from the first Hall-effect element 30a of the rotation detecting circuit 320 and produce a voltage signal substantially proportional to the repetition frequency of the input signal.

The output signal from the first Hall-effect element 30a is fed through an inverting circuit of a transistor 31 to a capacitor 32 and appears as an integrated signal at the capacitor. The output signal is then applied to the inverted input terminal of the operational amplifier 18 of the rotational speed setting circuit 300.

The switching control circuit 340 is provided to decide the operation timing of the transistors 37a, 37b, 38a, 38b, 39a, 39b which constitute the driving circuit 360. To this end, the switching control circuit 340 is composed mainly of a switching circuit 33 having a logic circuit constructed to output switching signals shown in FIGS. 10(d)–10(i) based on the output signals from the rotation detecting circuit 320. In these figures, reference characters U, V, W and U', V', W' correspond respectively to the transistors 37a, 37b, 38a, 38b, 39a, 39b, and the signals shown therein indicates the on-off operation of these transistors 37a, 37b, 38a, 38b, 39a, 39b.

The drive input control circuit 350 inputs output signals from the rotational speed setting circuit 300 and the switching control circuit 340, and supplies the driving circuit 360 with outputs driving signals corresponding to the setting rotational speed in a timing determined by the output signals from the switching control circuit 340.

The drive input control circuit 350 is composed mainly of three structurally identical waveform shaping circuits 34a–34c.

Figure 20:
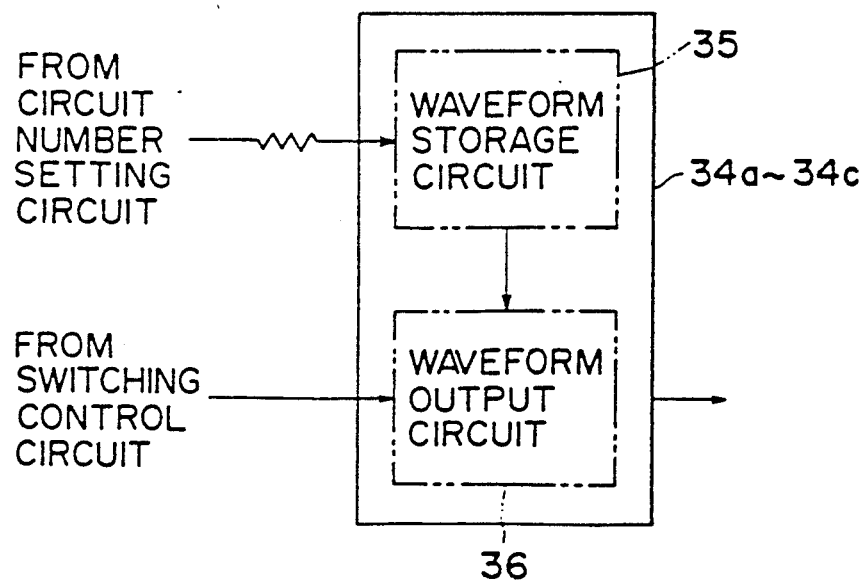
FIG. 20 is a block diagram showing a waveform shaping circuit incorporated in the apparatus shown in FIG. 19.

Each of the waveform shaping circuits 34a–34c is composed of a waveform storage circuit 35 and a waveform output circuit 36 a shown in FIG. 20.

The waveform storage circuit 24 is provided for changing the output waveform of the drive input control circuit 350 depending on the output voltage from the rotational speed setting circuit 300. For instance, the waveform storage circuit 24 stores three kinds of waveforms shown in FIGS. 21(a)–21(c) and when the setting rotational speed of the blower motor 1 is a low speed (i.e., when the output voltage from the rotational speed setting circuit 300 is small), it outputs a sine waveform signal shown in FIG. 21a. When the setting rotational speed is an intermediate speed (i.e., when the output voltage from the rotational speed setting circuit 300 is at an intermediate value), the waveform storage circuit 24 outputs a trapezoidal waveform signal shown in FIG. 21(b). When the setting rotational speed is a high (i.e., the output voltage from the rotational speed setting circuit 300 is large), the waveform storage circuit 24 outputs a rectangular waveform signal shown in FIG. 21(c).

The waveform output circuit 36 amplifies the output signal from the waveform storage circuit 35 at a predetermined amplifying ratio which is inversely proportional to the magnitude of the output voltage from the rotational speed setting circuit 300 and output a the amplified signal in accordance with the timing of the output signal from the switching control circuit 340.

The driving circuit 360 controls excitation of the respective phases of the stator coil 1b of the blower motor 1 and is composed mainly of the transistors 37a, 37b, 38a, 38b, 39a, 39b.

The transistors 37a, 37b, 38a, 38b, 39a, 39b are adapted to be turned on and off depending on the output timing of the output signals from the switching control circuit 340 and the drive input control circuit 350. They supply exciting currents via the terminals $T_8$–$T_{10}$ to the stator coil 1b of the blower motor 1. With this arrangement, the on-off operations of the respective transistors 37a, 37b, 38a, 38b, 39a, 39b take place in the timing as shown in FIGS. 10(d)–10(i). With the excitation of the respective windings of the stator coil 1b by the pulse signals shown in FIGS. 10(d)–10(i), the blower motor 1 produces a rotational magnetic field rotating in the order from the U-phase through the V-phase toward the W-phase.

The voltage-regulating transformer circuit 370 is connected to the externally connected dc power supply 7 for regulating the output voltage so as to output a stable dc voltage. The voltage-regulating transformer circuit 370 comprises an transformer element composed of an integrated circuit (IC) package known per se and has a function to reduce a dc 12V to a dc 5V.

The blower motor 1 connected via the external terminal $T_8$–$T_{10}$ to the apparatus is of the type known per se including the stator coil 1b having the U-phase, V-phase and W-phase windings 1e–1e, and the rotor 1f composed of a permanent magnet, and hence a further description is no longer necessary.

Figure 21A:
FIGS. 21(a)-21(c) are views showing waveforms to be supplied to a brushless motor of the apparatus shown in FIG. 19.

The blower motor 1 control apparatus of the foregoing construction will operate as follows. The speed setter 2 is set to a relatively low speed of rotation before the operation of the apparatus begins. When a non-illustrated power switch is turned on to energize the dc power supply 7, the voltage supplied to the non-inverted input terminal of the operational amplifier 18 is amplified at a predetermined amplification degree or ratio and the thus amplified voltage is output from the output terminal of the operational amplifier 18. In substantially direct proportion to the output voltage, an exciting current flows through the stator coil 1b whereupon the rotor 1f is rotated. In this instance, the exciting current supplied to the stator coil 1b has a sign waveform such as shown in FIG. 21(a) owing to the operation of the drive input control circuit 350. The starting operation of the blower motor 1 begins smoothly without an unpleasant beat noise which may be generated from the stator coil 1b due to a rush current supplied thereto at the start of the blower motor 1 when a square waveform signal is used. As the rotational speed of the rotor 1f approaches the setting rotational speed, the output voltage from the A/V converting circuit 330 gradually increases while the exciting current from the driving circuit 360 decreases. When the rotational speed of the blower motor 1 reaches the setting rotational speed, the predetermined exciting current is maintained to thereby keep the setting rotational speed.

When the discharge mode is changed from the vent mode to the defrost mode, for example, the flow resistance in the air-flow duct increases. This increase in flow resistance causes a sirocco fan (not shown) mounted on the blower motor 1 to idle, which tends to increase the rotational speed of the blower motor 1. However, according to this embodiment, the voltage level supplied to the non-inverted input terminal of the operational amplifier 18 is reduced by the closure of the defrost mode detecting switch 25. Consequently, the setting rotational speed is caused to drop, thereby prevent increase in rotational speed of the blower motor 1.

Figure 21B:
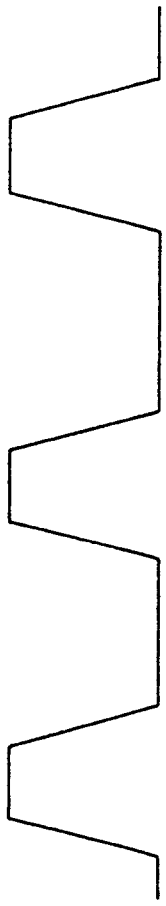
Figure 21C:
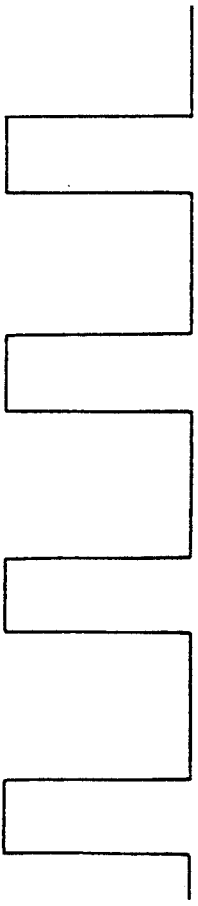

When the motor rotational speed is set to a high speed level by the speed setter 2, the stator coil 1b receives the rectangular wave signal shown in FIG. 21(c). Consequently, the exciting current flowing through the stator coil 1b rises more steeply than the exciting current observed at the low speed stated above. With this sharp rise of the exciting current, a delay in staring of the blower motor 1 becomes smaller than that observed at the low speed and the blower motor 1 is driven with a larger electrical power than that supplied at the low speed.

According to the first embodiment described above, the selection of the waveform and decision of the signal level in the waveform shaping circuits 34a–34c are performed depending on the largeness magnitude of the output signal from the rotational speed setting circuit 300. Such a waveform selection and signal level decision may be performed depending on the output voltage from the speed setter 2 or on the output voltage from the F/V converting circuit 330.

Figure 23:
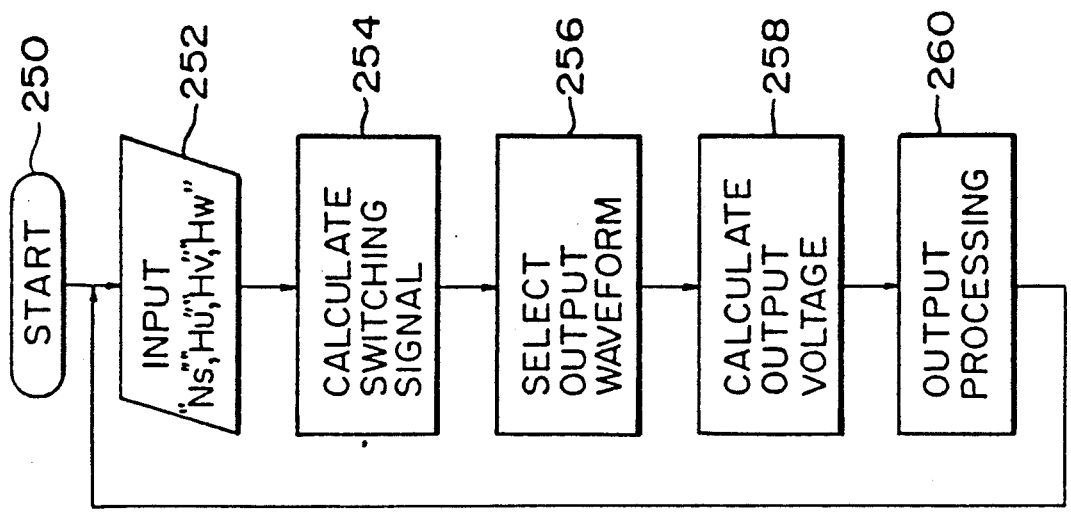
FIG. 23 is a flowchart showing a control routine achieved by a microcomputer incorporated in the apparatus shown in FIG. 22 for controlling the operation of a brushless motor.

A second embodiment according to a fourth aspect of the present invention will be described below with reference to FIGS. 22 and 23.

Figure 22:
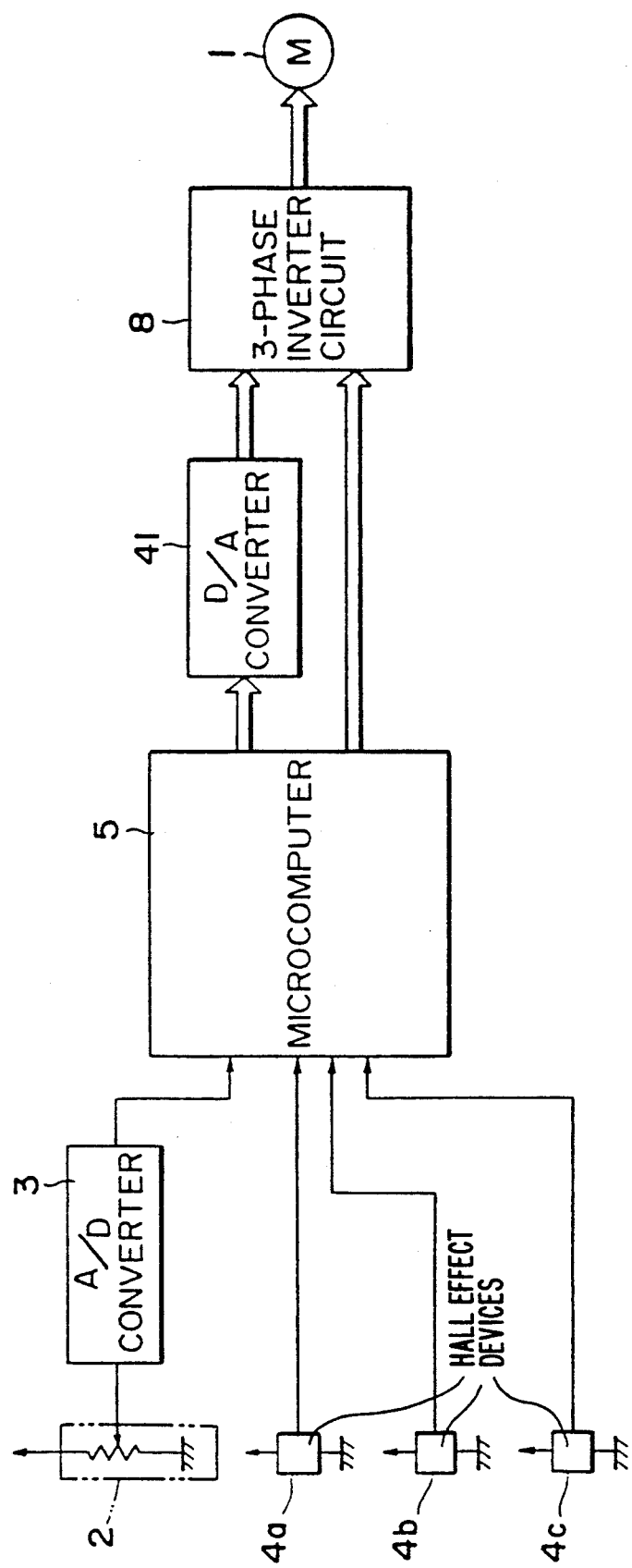
FIG. 22 is a block diagram showing a second embodiment of the apparatus shown in FIG. 18.

The second embodiment includes a microcomputer 5 as shown in FIG. 22 in which these parts corresponding to those of the first embodiment described above are designated by like or corresponding reference characters.

The microcomputer 5 is of the construction known per se including a central processing unit (CPU), a read-only memory (ROM), a random access memory (RAM), an input/output port (I/O), etc. To the microcomputer 5, a setting value of the speed setter 2 which is digitized by an analog-to-digital (A/D) converter 3, and detected signals supplied from Hall ICs 4a–4c are inputted. The Hall ICs 4a–4c are an integrated circuit including Hall-effect elements 32a–32c which are identical to those described with respect to the first embodiment, and a circuit portion having the function of an amplifying circuit and a waveform shaping circuit. The Hall ICs 4a–4c output TTL level signal outputs.

The microcomputer 5 uses a predetermined program and supplies an output signal from its I/O port either directly to a three-phase inverter circuit 8 or indirectly a digital-to-analog (D/A) converter 41 connected to the I/O port, thereby controlling the operation of the blower motor 1.

The three-phase inverter circuit 8 is structurally the same as that of the first embodiment and hence a description is no longer necessary.

An example of the control of the blower motor 1 achieved under the control of the microcomputer 5 will be described below with reference to a flowchart shown in FIG. 23.

The microcomputer 5 starts its control program stored therein from a step 250. Then, the control advances to a step 252 which inputs a setting rotational speed $N_S$ set by the speed setter 2, and the detected signals $H_U$, $H_V$ and $H_W$ from the respective Hall ICs 4a–4c. Thereafter, the control goes on in a step 254.

The step 254 decides the switching signals to be outputted to the three-phase inverter circuit 8 based on the input signals $N_S$, $H_U$, $H_V$ and $H_W$ In other words, this step produces such switching signals shown in FIGS. 10(d)–10(i) by calculations a based on the input signals $N_S$, $H_U$, $H_V$ and $H_W$.

The step 254 is followed by a step 256 which decides the waveform and magnification of the signals to be inputted to the three-phase inverter circuit 8 through the D/A converter 41. In practice, when $N_S$ is a low speed within a predetermined range, then the waveform shown in FIG. 21(a) is selected. Similarly, when $N_S$ is an intermediate speed within a predetermined range, the waveform shown in FIG. 21(b) is selected. Furthermore, when $N_S$ is a high speed within a predetermined range, then the waveform shown in FIG. 21(c) is selected. Selection of these waveforms is achieved by selecting predetermined storage areas in the ROM in which the corresponding waveforms are previously stored in the form of digital coded signals. The digital signals are converted into analog signals via the D/A converter 41. The output of these signals to the D/A converter 41 is carried out through an output operation achieved in a step 260.

The step 256 is followed by a step 258 which calculate a signal level of the waveform selected in the step 256. For calculation, a plurality of waveform patterns of different levels are provided in the ROM with respect to each of three waveforms. The difference between the setting rotational speed $N_S$ and the current rotational speed N (current rotational speed detected by the Hall IC 4a) is calculated. As the difference thus calculated becomes larger, a waveform of a larger level is selected from the ROM. Thereafter, the control advances to a step 260.

The step 260 outputs the signal decided through the foregoing processing steps to the D/A converter 41 and to the three-phase inverter circuit 8, thereby controlling the operation of the blower motor 1. Thereafter, the control returns to the step 252 and the foregoing steps of operation are repeated in the order described above.

Obviously, various modifications and variations of the present invention are possible in the light of the above teaching. It is therefore to be understood that within the scope of the appended claims the present invention may be practiced otherwise than as specifically described.

What is claimed is:

1. An apparatus for controlling a blower motor having a brushless motor, comprising:

(a) a drive condition deciding means for determining a pulse width supplied to the blower motor, the pulse width determined in direct proportion to at least a target rotational speed of the blower motor;

(b) an exciting timing deciding means for determining an exciting timing of an exciting coil of the blower motor in accordance with a number of pulses which are determined in inverse proportion to the target rotational speed corresponding to the pulse width determined by the drive condition deciding means so as to equal an average electrical power in a period which is determined based on the target rotational speed and a changing position of a rotor magnet detected by Hall ICs disposed inside the blower motor; and (c) a driving means for driving the blower motor based on the pulse width determined by the drive condition deciding means and the exciting timing determined by the exciting timing deciding means.

2. An apparatus for controlling a blower motor having a brushless motor, comprising:

(a) a rotation deciding means for determining a rotational speed of the blower motor based on a target rotation speed, having a plural waveform patterns;

(b) an exciting timing deciding means for determining an exciting timing of an exciting coil of the blower motor based on the target rotational speed and a changing position of a rotor magnet detected by Hall ICs disposed inside the blower motor;

(c) a driving means for driving the blower motor based on an output signal from the rotational deciding means and an output signal from the exciting timing deciding means; and (d) a signal disturbance means for disturbing the output signal from the rotational deciding means by selecting one of the plural waveform patterns at random while the blower motor is driven at a substantially constant speed.

3. An apparatus for controlling a blower motor having a brushless motor, comprising:

(a) a rotation deciding means for determining a rotational speed of the blower motor based on a target rotation speed, having a plural waveform patterns;

(b) an exciting timing deciding means for determining an exciting timing of an exciting coil of the blower motor based on the target rotational speed and a changing position of a rotor magnet detected by Hall ICs disposed in the blower motor;

(c) a driving means for driving the blower motor based on an output signal from the rotational deciding means and an output signal from the exciting timing deciding means; and (d) a timing disturbance means for disturbing the output signal from the exciting timing deciding means by stopping one of the output signals in a constant term.

4. An apparatus for controlling a blower motor, comprising:

(a) a voltage waveform selecting means for selecting and outputting a sine wave when the blower motor is rotating at a low speed, selecting and outputting a substantially trapezoidal wave when the blower motor is rotating at an intermediate speed, and selecting and outputting a square wave when the blower motor is rotating at a high speed; and (b) a driving means for driving the blower motor according to an output from the voltage waveform selecting means.

* * * * *